United States Patent
Iu

(10) Patent No.: US 9,328,249 B2
(45) Date of Patent: May 3, 2016

(54) OPTICALLY CLEAR FLUID COMPOSITION

(75) Inventor: Kai-Kong Iu, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 13/882,342

(22) PCT Filed: Dec. 23, 2010

(86) PCT No.: PCT/US2010/062019
§ 371 (c)(1),
(2), (4) Date: Apr. 29, 2013

(87) PCT Pub. No.: WO2012/087331
PCT Pub. Date: Jun. 28, 2012

(65) Prior Publication Data
US 2013/0222496 A1    Aug. 29, 2013

(51) Int. Cl.
| | | |
|---|---|---|
| *B41J 2/01* | (2006.01) | |
| *C09D 11/30* | (2014.01) | |
| *B41J 2/21* | (2006.01) | |
| *B41M 7/00* | (2006.01) | |
| *C09D 11/322* | (2014.01) | |

(52) U.S. Cl.
CPC ............... *C09D 11/30* (2013.01); *B41J 2/2107* (2013.01); *B41J 2/2114* (2013.01); *B41M 7/0036* (2013.01); *C09D 11/322* (2013.01)

(58) Field of Classification Search
USPC ............. 347/98, 100; 523/122; 524/104, 377, 524/386, 388, 430
See application file for complete search history.

(56) References Cited

U.S. PATENT DOCUMENTS

| | | | |
|---|---|---|---|
| 5,624,484 A * | 4/1997 | Takahashi et al. | 106/31.75 |
| 6,261,700 B1 * | 7/2001 | Olson et al. | 428/522 |
| 6,464,348 B1 | 10/2002 | Kasperchik et al. | |
| 6,613,403 B2 | 9/2003 | Tan et al. | |
| 6,723,784 B2 | 4/2004 | Ito et al. | |
| 6,939,601 B2 * | 9/2005 | Neppl et al. | 428/212 |
| 6,979,487 B2 | 12/2005 | Scarbrough et al. | |
| 7,297,454 B2 | 11/2007 | Ma et al. | |
| 7,649,030 B2 | 1/2010 | Iu | |
| 2004/0034144 A1 | 2/2004 | Scharfe et al. | |
| 2004/0123778 A1 * | 7/2004 | Bagala, Sr. | 106/415 |
| 2006/0189113 A1 * | 8/2006 | Vanheusden et al. | 438/597 |
| 2007/0060670 A1 | 3/2007 | Ellis | |

(Continued)

FOREIGN PATENT DOCUMENTS

| | | |
|---|---|---|
| CN | 1477160 | 2/2004 |
| CN | 101130646 | 2/2008 |

(Continued)

OTHER PUBLICATIONS

International Search Report and the Written Opinion for S.N. PCT/US2010/062019 dated Sep. 28, 2011 (11 pages).

*Primary Examiner* — Manish S Shah
(74) *Attorney, Agent, or Firm* — Dierker & Associates, P.C.

(57) ABSTRACT

An optically clear fluid composition includes a vehicle including an organic solvent, a polymeric binder dispersed in the vehicle, and metal oxide particles dispersed in the vehicle. The metal oxide particles have an effective diameter ranging from about 20 nm to about 140 nm, and are chosen from metal oxide particles that are optically clear and have a refractive index that is larger than 1.65, and the metal oxide particles are only one type of metal oxide particle selected from the group consisting of aluminum oxide and zinc oxide.

12 Claims, 1 Drawing Sheet

(56) References Cited

U.S. PATENT DOCUMENTS

| | | |
|---|---|---|
| 2007/0078213 A1* | 4/2007 | Mueller et al. ............... 524/449 |
| 2007/0166544 A1* | 7/2007 | Hennemann et al. ......... 428/405 |
| 2007/0197684 A1 | 8/2007 | Yamashita et al. |
| 2007/0248828 A1 | 10/2007 | Yoneyama et al. |
| 2008/0044651 A1 | 2/2008 | Douglas |
| 2008/0085369 A1 | 4/2008 | Cai et al. |
| 2010/0055421 A1 | 3/2010 | Carmody et al. |
| 2010/0221460 A1 | 9/2010 | Wexler et al. |
| 2010/0233392 A1 | 9/2010 | Batz-Sohn et al. |
| 2011/0039081 A1* | 2/2011 | Murouchi et al. ............ 428/212 |
| 2011/0306678 A1* | 12/2011 | Liu et al. ...................... 514/770 |

FOREIGN PATENT DOCUMENTS

| | | |
|---|---|---|
| CN | 101905582 | 12/2010 |
| EP | 1302324 | 4/2003 |
| EP | 2083052 | 7/2009 |
| EP | 2226422 | 9/2010 |
| JP | 04046302 A * | 2/1992 |
| JP | 2001-164136 | 6/2001 |
| JP | 2001164136 | 6/2001 |
| JP | 2007-069417 | 3/2007 |
| WO | WO 2008/022760 | 2/2008 |
| WO | WO 2009131104 | 10/2009 |

\* cited by examiner

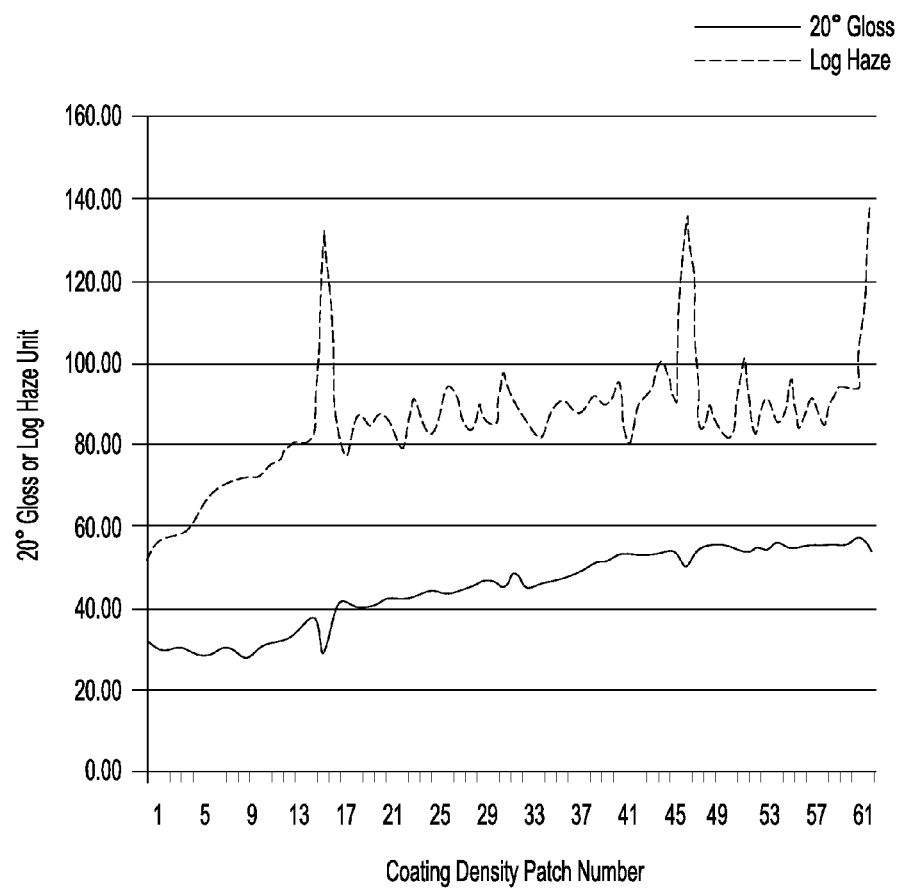

OPTICALLY CLEAR FLUID COMPOSITION

BACKGROUND

The present disclosure relates generally to optically clear fluid compositions.

Thermal inkjet printing systems may be used as an effective way of producing images on a print medium, such as paper. Thermal inkjet printing involves ejecting ink droplets from a nozzle at high speed onto the paper to produce an image thereon. The image that is produced may include photos, graphics, text, or combinations thereof.

Sometimes, a coating composition may be printed over the ink that was ejected onto the paper, such as to improve one or more characteristics of the printed image. Examples of these characteristics may include print quality, gloss, scratch resistance, and/or the like. However, in some instances, the coating composition may not be as compatible with the ink as desired, and in some cases, may not be jettable from a thermal inkjet printhead.

BRIEF DESCRIPTION OF THE DRAWING

Features and advantages of examples of the present disclosure will become apparent by reference to the following detailed description and drawing.

FIG. 1 is a graph showing the gloss and haze measurement of a 64 patch density ramp of a coating composition according to an example disclosed herein.

DETAILED DESCRIPTION

Example(s) of the fluid composition as disclosed herein may be printed over an image formed on a print medium, where the printing may be accomplished using a thermal inkjet printhead. Experimental results have shown that the print (which is formed by the image formed on the print medium, and the coating composition deposited over the image) exhibits improved gloss with reduced haze, as well as improved durability, at least in terms of scratch resistance and/or ultra-violet light blocking properties. Furthermore, the fluid composition (which may also be referred to herein as a coating composition) may be jetted from a thermal inkjet printhead without deleteriously affecting the architecture of the printhead (such as, e.g., the nozzles). The coating composition is also advantageously compatible with neutral or basic aqueous ink dispersions (e.g., aqueous ink dispersions having a pH ranging from about 7 to about 10). Some examples of such aqueous ink dispersions include basic pigment-based inks produced by Hewlett-Packard, Co. (e.g., the inks of the HP 38 and HP 70 series).

Additionally, the coating composition is considered to be optically clear so as not to deleteriously affect the visibility (e.g., in terms of clarity, sharpness, color, and/or the like) of the underlying image. As used herein, a composition that is "optically clear" refers to one that is optically transparent to visible light. In an example, the optically clear composition, when printed over the image, produces a print that exhibits minimal haze, if any. As such, the optically clear coating composition may be considered to be completely clear (i.e., the print exhibits no haze), or may be a slight variation thereof (i.e., the print exhibits a haze that is greater than zero, but less than a Log Haze of about 350 Log Haze units).

In an example, the optically clear fluid composition generally includes a vehicle including a polymeric binder and metal oxide nanoparticles dispersed therein. As used herein, the term "vehicle" refers to the combination of a carrier fluid and, in some instances, one or more additives to form the vehicle in which the polymeric binder and the metal oxide nanoparticles are dispersed. Further, the term "carrier fluid" refers to the liquid-based medium constituting the bulk of the vehicle, and this liquid-based medium is used to transport the solid-based components of the coating composition (e.g., the polymeric binder and the metal oxide nanoparticles) through a printer during printing.

In one example, the carrier fluid includes an organic solvent, which may be chosen from one or more water-soluble organic solvents and/or co-solvents, where each organic solvent and/or co-solvent individually contributes to the performance of the whole vehicle. Some examples of suitable organic solvents include dimethylformamide, dimethylacetamide, acetone, tetrahydrofuran, dioxane, polyethylene glycol, polypropylene glycol, ethylene glycol, propylene glycol, butylene glycol, 1,2-hexanediol, triethylene glycol, 1,2,6-hexanetriol, thiodiglycol, hexylene glycol, diethylene glycol, ethylene glycol methyl ether, diethylene glycol monomethyl ether, triethylene glycol monomethyl ether, ethanol isopropyl alcohol, n-butyl alcohol, isobutyl alcohol, glycerol, 2-pyrrolidone, n-methyl-2-pyrrolidone, 1,3-dimethylimidazolidinone, triethanolamine, sulfolane, dimethyl sulfoxide, and/or combinations thereof. The water-soluble organic solvent(s) may also be chosen from other amines, ketones, ethers (e.g., a glycerol ether such as a polyethoxylated ether of glycerol (LEG-1)), polyalkylene glycols, alkylene glycols, lower alkyl ethers of polyhydric alcohols, monohydric alcohols, and/or combinations thereof. The amount of the organic solvent(s) present in the coating composition ranges, for example, from about 2 wt % to about 30 wt % of the coating composition. In another example, the amount of the organic solvent(s) ranges from about 4 wt % to about 25 wt % of the coating composition. In yet another example, the amount of the organic solvent(s) ranges from about 6 wt % to about 20 wt % of the coating composition.

As previously mentioned, the vehicle may further include one or more additives. As one example, the additive may be chosen from one or more humectants. The humectant(s) may be included in the coating composition, e.g., to enhance the longevity of the coating composition (e.g., by preventing the coating composition from drying out). The humectant(s) may also be used to enhance the solubility characteristics of the composition, which may be maintained by retaining the moisture within the vehicle. Some examples of humectants that may be used in the vehicle include nitrogen-containing compounds (such as urea, thiourea, ethylene urea, alkylurea, alkylthiourea, dialkylurea, and dialkylthiourea), sugars (such as 1-deoxy-D-galactitol, mannitol, and inositol), polyols (e.g., diols and triols), heterocyclic ketones (such as 2-pyrrolidone, and hydantoin glycol (such as DANTOCOL® (Lonza Group, Ltd., Switzerland)), and combinations thereof. In an example, the amount of humectant(s) present in the coating composition (if any) ranges from about 2 wt % to about 30 wt % of the coating composition. In another example, the amount of humectant(s) present ranges from about 3 wt % to about 25 wt % of the coating composition. In still another example, the amount of humectant(s) present ranges from about 5 wt % to about 22 wt % of the coating composition.

In an example, the vehicle may also or otherwise include other additives, such as a surfactant, a biocide, or combinations thereof. The surfactant may be a single surfactant, or a combination of two or more surfactants. Some examples of the surfactant(s) that may be used as an additive in the vehicle include primary, secondary, and tertiary amine salt compounds (such as hydrochloric acid salts, acetic acid salts of laurylamine, coconut amine, stearylamine, and rosin amine), quaternary ammonium salt compounds (such as lauryltrimethylammonium chloride, cetyltrimethylammonium chloride, benzyltributylammonium chloride, and benzalkonium chloride), pyridinium salt compounds (such as cetylpyridinium chloride and cetylpyridinium bromide), nonionic surfactants (such as polyoxyethylene alkyl ethers, polyoxyethylene alkyl esters, acetylene alcohols, and acetylene glycols), 2-heptadecenyl-hydroxyethylimidazoline, dihydroxyethylstearylamine, stearyldimethylbetaine, lauryldihydroxyethylbetaine, alkylphenylethoxylate (such as, e.g., SURFYNOL® CT-211, Air Products and Chemicals, Inc., Allentown, Pa.), and combinations thereof.

The surfactant(s) may also or otherwise be chosen from fluorosurfactants such as, e.g., ZONYL® FSO (E.I. DuPont de Nemours & Co., Inc, Wilmington, Del.). The amount of the surfactant(s) present in the coating composition, if used, ranges, for example, from about 0.01 wt % to about 3 wt % of the coating composition. In another example, the amount of the surfactant(s), if used, ranges from about 0.1 wt % to about 2.5 wt % of the coating composition. In yet another example, the amount of the surfactant(s), if used, ranges from about 0.5 wt % to about 2 wt % of the coating composition.

The biocide may be incorporated into the coating composition, as an additive in the vehicle, to inhibit the growth of potentially harmful microorganisms in the composition. Thus, the term "biocide" may be used to describe both a biocide and a fungicide. Some examples of biocides include the biocides of the NEUSEPT® family (International Specialty Products, Wayne, N.J.), UCARCIDE™ (Mid South Chemical, Ringgold, La.), VANCIDE® (R.T. Vanderbilt Company, Inc., Norwalk, Conn.), PROXEL™ (Arch Chemicals, Norwalk, Conn.), and combinations thereof. The amount of the biocide(s) present in the coating composition, if used, ranges, for example, from about 0.01 wt % to about 2 wt % of the coating composition. In another example, the amount of the biocide(s), if used, ranges from about 0.05 wt % to about 1.5 wt % of the coating composition. In yet another example, the amount of the biocide(s), if used, ranges from about 0.1 wt % to about 1.25 wt % of the coating composition.

The polymeric binder is incorporated into the coating composition to provide at least some adhesion of the coating composition to the substrate upon which the coating composition is deposited. In some cases, the binder also imparts at least some mechanical and optical properties to the coating composition such as, e.g., scratch and/or rub resistance and enhancement in gloss. In an example, the polymeric binder may be chosen from any of polyurethanes, acrylic binders, or combinations thereof. Some specific examples of polymeric binders include waterborne acrylic binders (i.e., those that are water-transportable or water-soluble), styrene acrylics, styrene maleic anhydrides, polyurethane acrylics, and polyurethanes. Some specific examples of the polymeric binder may include those chosen from the JONCRYL® family (such as, e.g., JONCRYL® 683) manufactured by BASF Corp., Florham Park, N.J., the CARBOSET® family and the SANSURE® family, both manufactured by Lubrizol Corp., Wickliffe, Ohio, and the ROSHIELD® family manufactured by the Dow Chemical Co., Midland, Mich. The amount of the polymeric binder(s) present in the coating composition ranges, for example, from about 0.5 wt % to about 20 wt % of the coating composition. In another example, the amount of the binders(s) ranges from about 1 wt % to about 10 wt % of the coating composition. In yet another example, the amount of the binders(s) ranges from about 1.5 wt % to about 5 wt % of the coating composition.

It is to be understood that the polymer binder is also chosen from those that also function as a viscosity modifier and a pH buffer, and thus an additional viscosity modifier and/or pH buffer is not needed in the coating composition. However, it is further to be understood that, in another example, a separate viscosity modifier and/or a pH buffer may be included in the coating composition if desired.

The metal oxide particles that are incorporated into the coating composition are nanoparticles. As used herein, a "nanoparticle" refers to a particle having an effective diameter or size falling within the nanometer range. In one example, the metal oxide nanoparticles have an effective diameter that ranges from about 20 nm to about 140 nm. In yet another example, the metal oxide nanoparticles have an effective diameter that is greater than about 20 nm and less than about 100 nm.

Without being bound to any theory, it is believed that using metal oxide particles having an effective diameter or size that falls within the nanometer range, e.g., within the range from about 20 nm to about 140 nm, enables the coating composition to be jettable from a thermal inkjet printhead without deleteriously affecting any of the printhead components (e.g., the nozzles). In another example, the metal oxide particles have an effective diameter or size ranging from about 60 nm to about 140 nm. This is unlike other known coating compositions that may incorporate metal oxide particles having an effective diameter or size that is about 0.2 microns or larger, which may clog and, in some cases, break the nozzle(s) of the thermal inkjet printhead.

Further, the effective diameter or size of the metal oxide particles of the coating composition generally falls within the same range as the effective diameter or size of the pigment particles of the ink deposited onto the medium. In instances where the metal oxide particles are larger than the size of the ink pigment particles, the surface of the film produced by the coating composition when deposited onto the medium may be considered to be rough and may be prone to high scattering of light. In an example, a film surface roughness having a Log Haze measurement that is greater than 350 Log Haze units is generally not acceptable. The high scattering of light may be increased in instances where the coating film or layer (having a rough surface) is relatively thin (e.g., less than about 0.5 microns). As used herein, "high" scattering of light occurs with lower gloss measurements (e.g., less than 50 gloss units at a 20° angle of incidence); higher gloss measurement variance among colors (e.g., a variance among colors of more than 15 gloss units at a 20° angle of incidence); or a combination of both. The high scattering of light may be reduced, for example, by depositing a larger amount of the coating composition onto the medium to produce a thicker coating layer (e.g., thicker than about 1 micron). However, the thicker coating layer may, in some instances, deleteriously affect the coating process, at least in terms of printing cost and time (e.g., the thicker coating may slow down the through-put).

Additionally, the coating composition should be chemically compatible with the ink established on the medium upon which the coating composition will be deposited. For instance, the pH of the coating composition affects the particle size of the metal oxide, which is insoluble in the ink vehicle system. For aqueous ink dispersions, a charge stabilization method often occurs to charge water insoluble particles (such as, e.g., the pigment or the metal oxide). In an example of the present disclosure, both the color pigment dispersion (ink) and the metal oxide dispersion (coating composition) are at basic pH ranging from about 8 to about 10. At a pH of 10, for example, the particle surfaces are considered to be almost completely charged (e.g., from about 95% to about 100% charged). As the pH decreases from 10, the surface charge decreases, and the particles start aggregating. This aggregation of the particles increases the particle size. In an example, the pH of the coating composition should match (e.g., within 0.5 pH units) that of the ink.

The metal oxide particles are chosen from those that are optically clear (e.g., those that are transparent to visible light) and have a refractive index that is larger than 1.65. The metal oxide particles are also chosen from those that, when incorporated into the coating composition, renders the composition as compatible with high pH aqueous ink dispersions (as mentioned above). In an example, the dispersions incorporating a metal oxide, alone or in combination with another metal oxide, have a pH that is greater than about 7. In another example, the dispersions incorporating a metal oxide, alone or in combination with another metal oxide, have a pH falling with the range of about 7 to about 10.

In an example, the metal oxide particles are chosen from zinc oxide (which has a refractive index of about 1.9) and/or aluminum oxide (which has a refractive index of about 1.79). It is to be understood that other metal oxides (e.g., silica) could be used to form a coating composition that has a pH that is compatible with high pH aqueous inks. The particles of these metal oxides, however, are not optically clear enough to render the coating composition within which the oxide is incorporated as optically clear according to the definition set forth above. Furthermore, silica has a refractive index of about 1.45, which is lower than the refractive index of the metal oxides chosen for the ink dispersions disclosed herein. As such, incorporating silica into the ink dispersion would render the dispersion as relatively hazy.

In one example, the metal oxide for the ink dispersion disclosed herein may be chosen from NanoArc® Aluminum Oxide, which is a 100% crystalline, non-agglomerated aluminum oxide nanopowder manufactured by Nanophase Technologies, Romeoville, Ill. In another example, the metal oxide may be chosen from zinc oxide nanoparticles of the NanoBYK® series manufactured by BYK-Gardner, Germany, or may be chosen from zinc oxide nanoparticles or aluminum oxide nanoparticles manufactured by Air Products and Chemicals, Inc., Allentown, Pa. (such as, e.g., S44Z nano-ZnO particles). In an example, the metal oxide particles are present in the coating composition in an amount ranging from about 0.05 wt % to about 10 wt % of the coating composition. In another example, the metal oxide particles are present in an amount ranging from about 0.05 wt % to about 8 wt % of the coating composition. In yet another example, the metal oxide particles are present in an amount ranging from about 0.5 wt % to about 5 wt %.

One example of a coating composition that is printable via a thermal inkjet (TIJ) printhead, and when deposited over an image produces a print that exhibits improved gloss and scratch resistance has the following formulation:

a polymeric binder chosen from polyurethane and/or an acrylic binder;

organic solvents chosen from 1,2-hexandiol, 2-pyrrolidone, and LEG-1;

surfactants chosen from SURFYNOL® CT-211 and ZONYL® FSO;

metal oxide nanoparticles; and a biocide chosen from PROXEL® GXL.

The coating composition may be made by forming the vehicle, and then dispersing, in no particular order, the polymeric binder and the metal oxide nanoparticles in the vehicle. In an example, the vehicle may be formed by mixing the organic solvent(s) and additive(s), if any, in water. Then the polymeric binder and the metal oxide nanoparticles are dispersed in the vehicle by adding the polymeric binder and the metal oxide nanoparticles to the vehicle, or visa versa, and then mixing the components together.

The mixing may be performed via any of ultrasonic mixing or mechanical mixing. One example of ultrasonic mixing includes ultrasonic agitation. Examples of mechanical mixing include high shear mechanical mixing, high pressure mixing, shaking, pumping, and/or the like, and/or combinations thereof. The mixing may be performed for any amount of time sufficient to completely/substantially completely disperse the polymeric binder and the metal oxide into the vehicle.

Also disclosed herein is a printing method, which involves depositing an ink onto a medium to form a printed image. The printed image may include, for example, alphanumeric indicia, graphical indicia, or combinations thereof. Then, the coating composition is deposited over the printed image to form a coating on the medium. In an example, only the inked portions of the medium are coated with the coating composition. In another example, the entire surface of the medium is coated with the composition, including the inked portions and the non-inked portions of the medium. Further, the coating is deposited on the printed image (or the entire surface of the medium) in an amount sufficient to produce a coating layer or film having a thickness that allows the print to exhibit improved gloss and scratch resistance. In an example, the coating layer or film has a thickness ranging from about 0.3 microns to about 6 microns. In another example, the coating layer has a thickness ranging from about 0.5 microns to about 5 microns. In yet another example, the coating layer has a thickness ranging from about 0.6 microns to about 3 microns.

The depositing of the ink and of the coating composition may each be accomplished via thermal inkjet printing. As used herein, the term "inkjet printing" refers to non-impact methods for producing images by the deposition of ink droplets in a pixel-by-pixel manner onto an image-recording medium in response to appropriate commands, such as digital signals. Printers that use thermal inkjet printing methods are those that are configured to eject a droplet of the ink and of the coating from respective chambers in the printer when a pulse of current is passed through a heating element causing a rapid vaporization of the ink and/or of the coating in the chamber to form a bubble. This causes a large pressure increase that propels a droplet of ink or of the coating composition onto the medium.

To further illustrate the present disclosure, examples are given herein. It is to be understood that these examples are provided for illustrative purposes and are not to be construed as limiting the scope of the disclosure.

EXAMPLES

For Examples 1 through 4 set forth below, two coating compositions of the instant disclosure and a control sample were prepared. The first coating composition (identified as Composition A) included zinc oxide nanoparticles, the second composition included aluminum oxide nanoparticles, and the control sample included no metal oxide particles. The formulation for Compositions A and B and the control sample are set forth in Table 1 below:

TABLE 1

Formulation of coating compositions
A and B, and the control sample

| | Composition A (wt %) | Composition B (wt %) | Control Sample (wt %) |
|---|---|---|---|
| Binder | 2 | 2 | 2 |
| 1,2-hexanediol | 4 | 4 | 4 |
| 2-pyrrolidone | 4 | 4 | 4 |
| LEG-1 | 2 | 2 | 2 |
| SURFYNOL ® CT-211 | 0.65 | 0.65 | 0.65 |
| ZONYL ® FSO | 0.19 | 0.19 | 0.19 |
| Zinc Oxide | 2 | 0 | 0 |
| Aluminum Oxide | 0 | 2 | 0 |
| PROXEL ® GXL | 0.2 | 0.2 | 0.2 |

Example 1

For this example, the Compositions A and B and the control sample were each formulated having a polyurethane binder. These compositions were individually printed on HP Vivid Glossy Photo Paper (Hewlett-Packard, Co.) to form a respective print. The gloss at a 20° angle of incidence and Log Haze values for each print were both determined for Compositions A and B and for the control sample using a Micro-Haze Plus, a portable haze meter manufactured by BYK-Garner GmbH, Germany. These values are shown in Table 2 below. Table 2 also provides the 20° gloss and Log Haze values for another print sample, where no coating composition was applied to the medium.

TABLE 2

Results of the 20° gloss and Log Haze measurement
of Compositions A and B and the Control Sample

| | 20° Gloss | Log Haze |
|---|---|---|
| Control Sample | 50.3 +/− 1.1 | 113.8 +/− 12.0 |
| Composition A | 58.7 +/− 1.2 | 105.1 +/− 8.7 |
| Composition B | 55.2 +/− 0.9 | 92.6 +/− 13.3 |
| No Coating | 29.9 +/− 3.8 | 54.3 +/− 10.6 |

As shown in Table 2, the print having the Composition A deposited thereon exhibited an improved gloss of at least about 8 gloss units compared with the control sample, where the print having Composition B deposited thereon exhibited an improved gloss of at least about 5 gloss units. Table 2 also shows that the gloss is significantly improved for all of the samples having a coating composition applied thereto compared with the sample that has no coating.

Furthermore, the results set forth in Table 2 shows that the Log Haze for the print having the Composition A deposited thereon was reduced by at least 8 compared with the control sample, and the Log Haze for the print having the Composition B deposited thereon was reduced by at least 21. Table 2 also shows that the Log Haze is significantly lower than that of any of the samples including a coating composition applied to the medium. This is due, at least in part, to the fact that the presence of the coating composition will impart at least some haze to the print. However, as shown in Table 2, the coating composition of the instant disclosure (e.g., Compositions A and B) exhibits reduced haze compared with that of the control sample.

Example 2

For this example, the Composition B and the control sample were each formulated having a styrene acrylic binder. These compositions were individually printed on HP Vivid Glossy Photo Paper (Hewlett-Packard, Co.) to form a respective print. The gloss at a 20° angle of incidence and Log Haze values for each print was determined for Composition B and for the control sample via the same method as described above for Example 1, and these values are shown in Table 3 below. Table 3 also provides the 20° gloss and Log Haze values for another print sample, where no coating composition was applied to the medium.

TABLE 3

Results of the 20° gloss and Log Haze measurement
of Composition B and the Control Sample

| | 20° Gloss | Log Haze |
|---|---|---|
| Control Sample | 82.8 +/− 4.1 | 158 +/− 12.0 |
| Composition B | 84.3 +/− 4.9 | 132.6 +/− 8.4 |
| No Coating | 29.9 +/− 3.8 | 54.3 +/− 10.6 |

As shown in Table 3, the print having the Composition B deposited thereon exhibited an improved gloss of at least about 2 gloss units compared with the control sample. Table 3 also shows that the gloss is significantly improved for all of the samples having a coating composition applied thereto compared with the sample that has no coating.

Furthermore, the results set forth in Table 3 show that the Log Haze for the print having the Composition B deposited thereon was reduced by at least 26 compared with the control sample. Table 3 also shows that the Log Haze is significantly lower than that of any of the samples including a coating composition applied to the medium.

Example 3

The scratch resistance for Compositions A and B and the control sample, each including a polyurethane binder, were compared with a silver halide (AgX) print, and the scratch resistance for Compositions A and B and the control sample, each including an acrylic binder, were also compared with a silver halide print. The scratch resistance test was performed using a 1.5 kg loaded stylus drawn on the print sample using the ASTM D 7187 standard test guide. The results of this test are set forth in Table 4 below:

TABLE 4

Scratch resistance of Compositions A and B and the
control sample compared to a silver halide print

| | Polyurethane binder | Acrylic binder |
|---|---|---|
| Composition A | Better | No data |
| Composition B | Better | Equal |
| Control Sample | Equal | Slightly worse than equal |

In Table 4 above, a scratch resistance that is classified as "better" refers to when the coating has not been scratched off, and the permanently scratched line drawn by the stylus can barely be seen by the human eye. Further, a scratch resistance that is classified as "equal" refers to when the coating has not been scratched off, but the permanently scratched line may easily be seen by the human eye. Thus, an "equal" scratch resistance is one that is substantially the same as a silver halide (AgX) photo print. Yet further, a scratch resistance that is classified as "slightly worse than equal" refers to when the coating can be scratched off, and such scratched line is visibly seen by the human eye.

As shown in Table 4, the compositions including the polyurethane binder exhibited better scratch resistance compared to the compositions including the acrylic binder. Table 4 also shows that Compositions A and B (i.e., those including the metal oxide nanoparticles of the instant disclosure) including a polyurethane binder or an acrylic binder exhibited better scratch resistance than the control sample (which did not include metal oxide nanoparticles).

Example 4

FIG. 1 provides the gloss and haze measurement of 64 patches density ramp, where patch 1 is the medium itself without any coating, and the amount of coating increasing from patch 2 through patch 64. The coating applied to the medium had the formulation of composition B which included aluminum oxide nanoparticles. As shown in FIG. 1, an increase in coating density resulted in an increase in gloss (identified by a solid line in FIG. 1), such as from 30 gloss units to 50 gloss units. An increase in coating density also resulted in an increase in haze (identified by a dashed line in FIG. 1). However, the magnitude of the increase in Log Haze is much less compared with pigmented ink images, where the Log Haze may increase beyond hundreds. For example, a Log Haze of about 400 or more may be measured for dark colors (i.e., those having a high optical density such as, e.g., yellow, magenta, cyan, black, or combinations thereof). The high Log Haze may be due, at least in part, to the fact that a high number of pigment particles are used to achieve the desired high optical density color. Thus, when the ink is deposited on the medium, the pigment particles tend to aggregate, which creates a rougher surface having a higher Log Haze.

It is to be understood that the ranges provided herein include the stated range and any value or sub-range within the stated range. For example, an amount ranging from about 20 nm to about 140 nm should be interpreted to include not only the explicitly recited amount limits of about 20 nm to about 140 nm, but also to include individual amounts, such as 25 nm, 72 nm, 100 nm, etc., and subranges, such as 30 nm to 50 nm, etc. Furthermore, when "about" is utilized to describe a value, this is meant to encompass minor variations (up to +/−8%) from the stated value.

While several examples have been described in detail, it will be apparent to those skilled in the art that the disclosed examples may be modified. Therefore, the foregoing description is not to be considered limiting.

What is claimed is:

1. An optically clear fluid composition, comprising:
a vehicle including an organic solvent;
a polymeric binder dispersed in the vehicle, wherein the polymeric binder is present in an amount ranging from about 0.5 wt % to about 4.9 wt % of the fluid composition; and
metal oxide particles dispersed in the vehicle, wherein:
the metal oxide particles have an effective diameter ranging from about 20 nm to about 140 nm;
the metal oxide particles are optically clear and have a refractive index that is larger than 1.65; and
the metal oxide particles are only one type of metal oxide particle selected from the group consisting of aluminum oxide and zinc oxide.

2. The fluid composition as defined in claim 1 wherein the polymeric binder is chosen from any of polyurethanes or acrylic binders.

3. The fluid composition as defined in claim 1 wherein the zinc oxide or the aluminum oxide has a pH that is greater than about 7.

4. The fluid composition as defined in claim 1 wherein:
the organic solvent is present in an amount ranging from about 2 wt % to about 30 wt of the fluid composition; and
the metal oxide particles are present in an amount ranging from greater than 5 wt % to about 10 wt % of the fluid composition.

5. The fluid composition as defined in claim 1, further comprising a surfactant present in an amount ranging from about 0.01 wt % to about 3 wt % of the fluid composition.

6. The fluid composition as defined in claim 1, further comprising an additive chosen from biocides, humectants, or combinations thereof.

7. The fluid composition as defined in claim 1 wherein the fluid composition is jettable from a thermal inkjet printhead.

8. A printing method, comprising:
depositing a pigmented ink onto a medium to form a printed image; and
depositing a clear coating composition over the printed image, the coating composition including:
an organic solvent present in an amount ranging from about 6 wt % to about 20 wt % of the coating composition;
a polymeric binder present in an amount ranging from about 0.5 wt % to about 4.9 wt % of the coating composition;
a surfactant present in an amount ranging from about 0.5 wt % to about 2 wt % of the coating composition; and
metal oxide nanoparticles that include one type of metal oxide nanoparticles chosen from zinc oxide or aluminum oxide, wherein the zinc oxide or the aluminum oxide has a pH that is greater than about 7;
wherein the coating composition is jettable from a thermal inkjet printhead.

9. The printing method as defined in claim 8 wherein the depositing of the pigmented ink and of the coating composition is accomplished using the thermal inkjet printhead.

10. The printing method as defined in claim 8 wherein the printed image exhibits improved gloss at a 20° angle of incidence and improved scratch resistance tested with ASTM D 7187 standard test guide compared to a second printed image that includes a coating composition with no metal oxide nanoparticles.

11. The printing method as defined in claim 10 wherein the coating composition includes:
polyurethane as the polymeric binder, the polyurethane being present in an amount of about 2 wt % of the coating composition;
2-pyrrolidone present in an amount of about 4 wt % of the coating composition;
a combination of 1,2-hexanediol and polyethoxylated ether of glycerol as the organic solvent, the 1,2-hexanediol being present in an amount of about 4 wt % of the coating composition and the polyethoxylated ether of glycerol being present in an amount of about 2 wt % of the coating composition;
an alkylphenylethoxylate and a fluorosurfactant as the surfactant, the alkylphenylethoxylate being present in an amount of about 0.65 wt % of the coating composition and the fluorosurfactant being present in an amount of about 0.19 wt % of the coating composition;
zinc oxide or aluminum oxide as the metal oxide nanoparticles, the zinc oxide or the aluminum oxide being present in an amount of about 2 wt % of the coating composition; and
a 20% aqueous dipropylene glycol solution of 1,2-benzisothiazolin-3-one present in an amount of about 0.2 wt % of the coating composition;

wherein a log haze of the printed image is reduced by at least 8 log haze units compared to a log haze of the second printed image and wherein the improved gloss of the printed image is increased by at least 5 gloss units.

12. The printing method as defined in claim 10 wherein the coating composition includes:
- a styrene acrylic binder as the polymeric binder, the styrene acrylic binder being present in an amount of about 2 wt % of the coating composition;
- 2-pyrrolidone present in an amount of about 4 wt % of the coating composition;
- a combination of 1,2-hexanediol and polyethoxylated ether of glycerol as the organic solvent, the 1,2-hexanediol being present in an amount of about 4 wt % of the coating composition and the polyethoxylated ether of glycerol being present in an amount of about 2 wt % of the coating composition;
- an alkylphenylethoxylate and a fluorosurfactant as the surfactant, the alkylphenylethoxylate being present in an amount of about 0.65 wt % of the coating composition and the fluorosurfactant being present in an amount of about 0.19 wt % of the coating composition;
- zinc oxide or aluminum oxide as the metal oxide nanoparticles, the zinc oxide or the aluminum oxide present in an amount of about 2 wt % of the coating composition; and
- a 20% aqueous dipropylene glycol solution of 1,2-benzisothiazolin-3-one present in an amount of about 0.2 wt % of the coating composition;
- and wherein a log haze of the printed image is reduced by at least 26 log haze units compared to a log haze of the second printed image.

* * * * *